(12) United States Patent
Fujimori (10) Patent No.: US 8,855,497 B2
(45) Date of Patent: Oct. 7, 2014

(54) OPTICAL TRANSMISSION SYSTEM

(75) Inventor: Tomoyoshi Fujimori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 196 days.

(21) Appl. No.: 13/418,805

(22) Filed: Mar. 13, 2012

(65) Prior Publication Data

US 2012/0237203 A1    Sep. 20, 2012

(30) Foreign Application Priority Data

Mar. 17, 2011    (JP) .................. 2011-059857

(51) Int. Cl.
*H04B 10/00* (2013.01)
*H04J 14/00* (2006.01)
*H04J 3/16* (2006.01)

(52) U.S. Cl.
CPC ......... *H04J 3/1652* (2013.01); *H04B 2210/072* (2013.01)
USPC ............................. 398/140; 398/58

(58) Field of Classification Search
CPC .................................... H04J 14/0272
USPC ............................... 398/5, 58, 140
See application file for complete search history.

(56) References Cited

U.S. PATENT DOCUMENTS

2010/0178060 A1    7/2010    Tazawa et al.

FOREIGN PATENT DOCUMENTS

JP    2004-266480    9/2004
JP    2010-166254    7/2010

OTHER PUBLICATIONS

ITU-T G. 709/Y. 1331 Interfaces for the Optical Transport Network (OTN), Dec. 1, 2009, 210pages.

*Primary Examiner* — Dalzid Singh
(74) *Attorney, Agent, or Firm* — Staas & Halsey LLP (57) ABSTRACT

There is provided an optical transmission system including: an optical transmitting apparatus including: a first processing circuit configured to process a transmission signal to be transmitted, a second processing circuit configured to process overhead data, the processed overhead data being multiplexed to the transmission signal, a retaining circuit configured to retain the overhead data, the retained overhead data being multiplexed to the transmission signal; and an insertion circuit configured to generate an identifier to be inserted into the retained overhead data; and an optical receiving apparatus including a detecting circuit configured to receive the transmission signal transmitted from the optical transmitting apparatus, and detect the identifier, wherein, when the overhead data is a predetermined state, the first processing circuit multiplexes the retained overhead data into which the identifier is inserted and the detecting circuit detects the identifier.

18 Claims, 10 Drawing Sheets

| FAULT INDICATION CODES | DEFINITION |
|---|---|
| 0000 0000 | NO FAULT |
| 0000 0001 | SIGNAL FAIL |
| 0000 0010 | SIGNAL DEGRADE |
| 0000 0011 ⋮ 1111 1111 | RESERVED |

# OPTICAL TRANSMISSION SYSTEM

CROSS-REFERENCE TO RELATED APPLICATION

This application is based upon and claims the benefit of priority of the prior Japanese Patent Application No. 2011-059857, filed on Mar. 17, 2011, the entire contents of which are incorporated herein by reference.

FIELD

The embodiments discussed herein are related to an optical transmission system.

BACKGROUND

An optical transport network (OTN) is one of optical transmission technologies that have been used. OTN is being standardized by the international telecommunication union-telecommunication sector (ITU T) and the institute of electrical and electronic engineers (IEEE).

The standardization of OTN has not been completed yet. Therefore, some optical transmission apparatuses using OTN use programmable large scale integrations (LSIs) such as field programmable gate arrays (FPGAs) so as to be applicable to OTN before and after the completion of the standardization.

In some cases, the scale of a circuit used to process OTN functions is larger than the circuit scale of available programmable LSIs. In such a case, the circuit processing the OTN functions is divided into a main signal system LSI performing main signal processing and a control system LSI performing processing excluding the main signal processing, for example. Examples of the processing excluding the main signal processing include overhead processing, an interface function of a central processing unit (CPU), and reset processing. In OTN, overheads (OHs) for monitoring a network are defined. Some of the overheads are dynamically changed by being processed by the CPU.

In an optical transmission system including an optical transmission apparatus provided with such a programmable LSI, there has been a technique of updating firmware of the programmable LSI included in the optical transmission apparatus without signal interruption in the main signal system. For example, there has been a technique of downloading new firmware of the control system LSI without stopping operation of the main signal system LSI, which is a so-called uninterrupted (hitless) firmware download, and updating the firmware of the control system LSI.

As such a related art technique, there has been a technique in which the main signal system LSI retains the overhead data processed by the control system LSI before the control system LSI starts the uninterrupted firmware download and the firmware of the control system LSI is updated while the main signal system LSI retains the overhead data. In OTN, a general communication channel (GCC) and an automatic protection switching (APS) are defined as the overheads, for example. The GCC and the APS are passed from the control system LSI to the CPU and processed by the CPU when the optical transmission apparatus is operating normally. Accordingly, they change dynamically.

As an example of the related art technique, there has been a system in which an identifier is added to an original signal on a transmitting side and the resulting signal is transmitted from the transmitting side to a receiving side through two different paths while one of the signals received on the receiving side through the two paths is restored on the receiving side, so that signal paths are switched in an uninterruptible manner. There has been a system in which a GCC mode switching dedicated frame is inserted into the GCC overhead on the transmitting side and sent to the receiving side while the GCC modes are switched between by determining whether the GCC mode switching dedicated frame is inserted into the GCC overhead on the receiving side.

Japanese Laid-open Patent Publication No. 2004-266480, Japanese Laid-open Patent Application No. 2010-166254 and "*Interfaces for the optical transport network (OTN)*", ITU-T G.709/Y.1331 (December 2009) are examples of the related art.

SUMMARY

According to an aspect of the embodiment, there is provided an optical transmission system including: an optical transmitting apparatus including: a first processing circuit configured to process a transmission signal to be transmitted, a second processing circuit configured to process overhead data, the processed overhead data being multiplexed to the transmission signal, a retaining circuit configured to retain the overhead data, the retained overhead data being multiplexed to the transmission signal, and an insertion circuit configured to generate an identifier to be inserted into the retained overhead data; and an optical receiving apparatus including a detecting circuit configured to receive the transmission signal transmitted from the optical transmitting apparatus, and detect the identifier, wherein, when the overhead data is a predetermined state, the first processing circuit multiplexes the retained overhead data into which the identifier is inserted and the detecting circuit detects the identifier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the related-art optical transmission apparatus, the overhead data retained by the main signal system LSI changes to an incorrect data because the overhead data, which was originally dynamically changing, is retained by the main signal system LSI when the uninterrupted firmware download of the control system LSI is executed. As a result, the optical transmission apparatus on the transmitting side transmits a signal having incorrect overhead data. Upon receiving the incorrect overhead data, the optical transmission apparatus on the receiving side sends an unnecessary alarm or switches a line in current use to another line although the line is actually normal, for example, because no information indicating that the optical transmission apparatus on the transmitting side is performing the uninterrupted firmware download operation is available.

Some optical transmission apparatuses transmit maintenance signals during execution of the uninterrupted firmware download. In an example of such optical transmission apparatuses, upon receiving the maintenance signals, the optical transmission apparatus on the receiving side sends an unnecessary alarm or switches a line in current use to another line, for example, in the same manner as in the case of receipt of the incorrect overhead data, because no information is available indicating that the uninterrupted firmware download operation is in progress in the optical transmission apparatus on the transmitting side.

The embodiments discussed herein aim to provide an optical transmission system that can avoid sending of an unnecessary alarm or unnecessary switching of lines.

Embodiments of an optical transmission system, an optical transmission apparatus, and an optical transmission method are described in detail below with reference to the accompanying drawings. In the optical transmission system, the optical transmission apparatus, and the optical transmission method, the apparatus on a transmitting side retains overhead data, and inserts an identifier relating to the retained overhead data into the overhead data while the apparatus on a receiving side detects the identifier. In the following embodiments, the same elements are labeled with the same reference numerals and repeated description thereof is omitted.

First Embodiment

Figure 1:
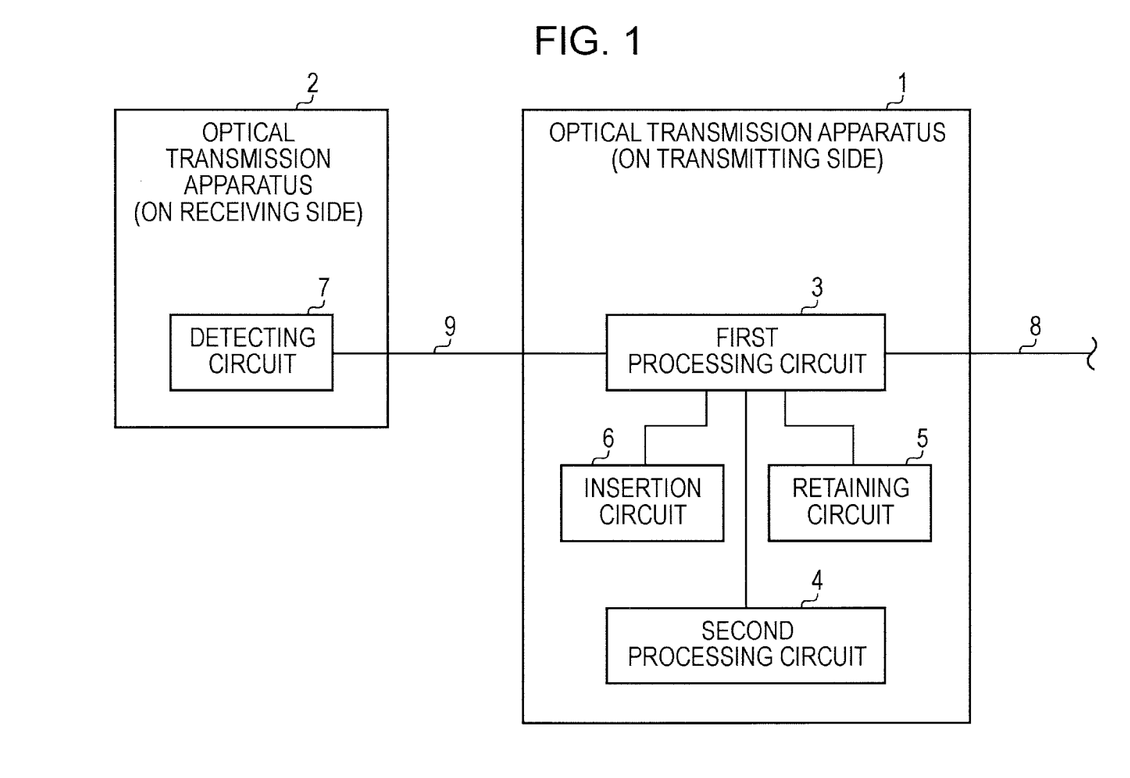
FIG. 1 is a block diagram illustrating an optical transmission system according to a first embodiment.

FIG. 1 is a block diagram illustrating an optical transmission system according to a first embodiment. As illustrated in FIG. 1, the optical transmission system includes an optical transmission apparatus 1 on the transmitting side (also referred to as an optical transmitting apparatus) and an optical transmission apparatus 2 on the receiving side (also referred to as an optical receiving apparatus). The optical transmission apparatus 1 on the transmitting side includes a first processing circuit 3, a second processing circuit 4, a retaining circuit 5, and an insertion circuit 6.

The first processing circuit 3 is connected to optical transmission paths 8 and 9 such as optical fibers. The first processing circuit 3 processes a signal to be transmitted to the optical transmission apparatus 2 on the receiving side. The second processing circuit 4 is coupled to the first processing circuit 3. The second processing circuit 4 processes the overhead data to be added to the signal to be transmitted to the optical transmission apparatus 2 on the receiving side. The retaining circuit 5 is coupled to the first processing circuit 3. The retaining circuit 5 retains the overhead data. The insertion circuit 6 is coupled to the first processing circuit 3. The insertion circuit 6 inserts the identifier relating to the overhead data into the overhead data.

The optical transmission apparatus 2 on the receiving side includes a detecting circuit 7. The detecting circuit 7 is connected to the optical transmission path 9. The detecting circuit 7 detects the identifier included in the overhead data of a received signal.

Figure 2:
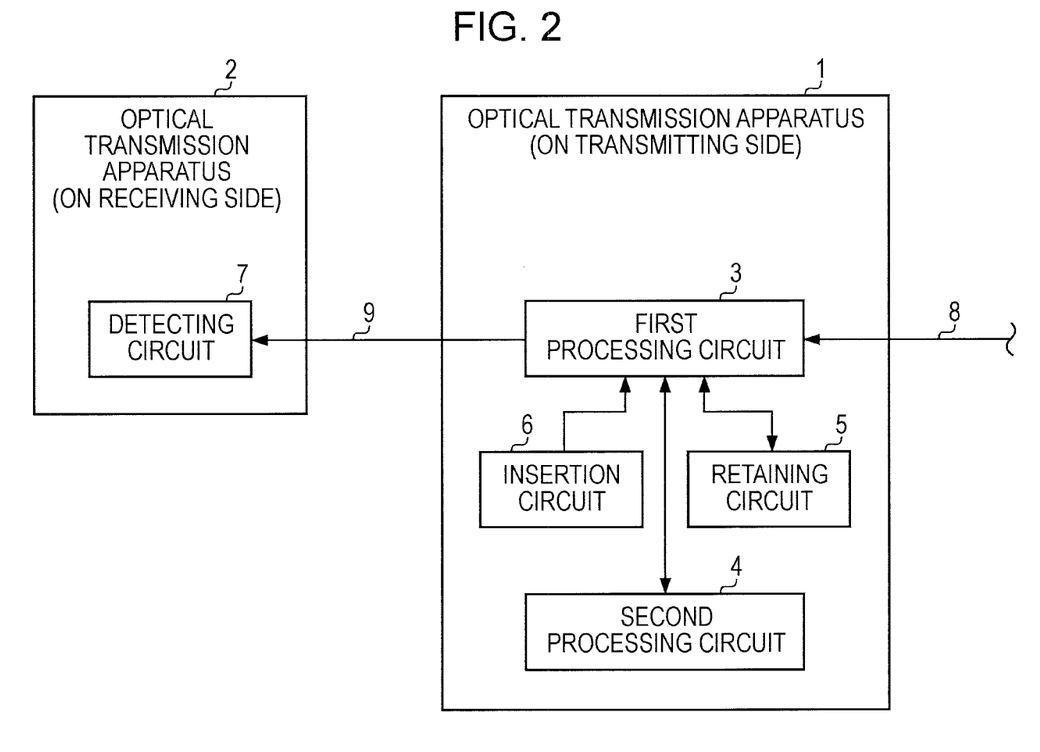
FIG. 2 is a block diagram illustrating a signal flow in the optical transmission system according to the first embodiment.
Figure 3:
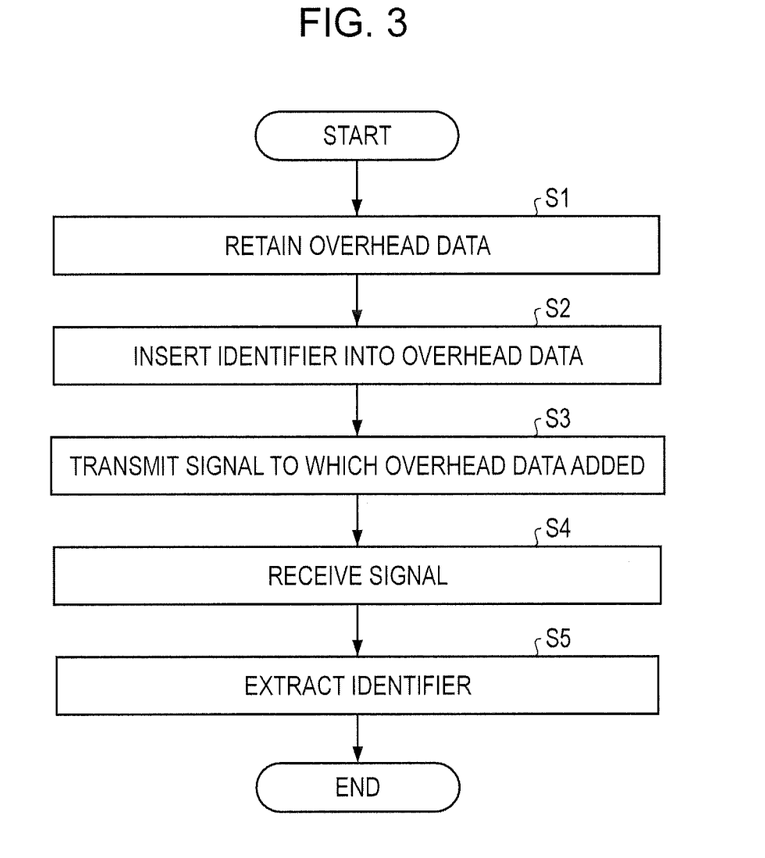
FIG. 3 is a flowchart illustrating an optical transmission method according to the first embodiment.

FIG. 2 is a block diagram illustrating a signal flow in the optical transmission system according to the first embodiment. FIG. 3 is a flowchart illustrating an optical transmission method according to the first embodiment. As illustrated in FIGS. 2 and 3, the first processing circuit 3 receives a signal from another optical transmission apparatus (not illustrated) through the optical transmission path 8 in the optical transmission apparatus 1 on the transmitting side. The first processing circuit 3 extracts the overhead data included in the received signal and passes the overhead data to the second processing circuit 4 or the retaining circuit 5. The second processing circuit 4 processes the overhead data to be added to the signal to be transmitted to the optical transmission apparatus 2 on the receiving side. The retaining circuit 5 retains the overhead data (operation S1 in FIG. 3).

The first processing circuit 3 processes a signal to be transmitted (also referred to as a transmission signal) to the optical transmission apparatus 2 on the receiving side. When processing the transmission signal, the first processing circuit 3 adds the overhead data passed from the second processing circuit 4 or the retaining circuit 5 to the transmission signal. The insertion circuit 6 inserts the identifier relating to the overhead data into the overhead data (operation S2 in FIG. 3). The first processing circuit 3 transmits the signal to which the overhead data has been added to the optical transmission apparatus 2 on the receiving side through the optical transmission path 9 (operation S3 in FIG. 3).

In the optical transmission apparatus 2 on the receiving side, the detecting circuit 7 receives the signal from the optical transmission apparatus 1 on the transmitting side through the optical transmission path 9 (operation S4 in FIG. 3). The detecting circuit 7 extracts the overhead data included in the received signal and detects the identifier included in the overhead data (operation S5 in FIG. 3).

According to the first embodiment, the optical transmission apparatus 2 on the receiving side can identify a state of the received overhead data by detecting the identifier included in the received overhead data. The optical transmission apparatus 2 on the receiving side can avoid a situation in which the optical transmission apparatus 2 sends an unnecessary alarm or unnecessarily switching lines by identifying the state of the received overhead data.

Second Embodiment

In a second embodiment, the optical transmission system and the optical transmission apparatus according to the first embodiment are applied to an optical transfer network (OTN). The optical transmission system and the optical transmission apparatus according to the first embodiment can be applied to any system besides OTN. In the second embodiment, a field programmable gate array (FPGA) is used as an example of a programmable large scale integration (LSI). The programmable LSI is not limited to an FPGA.

Figure 4:
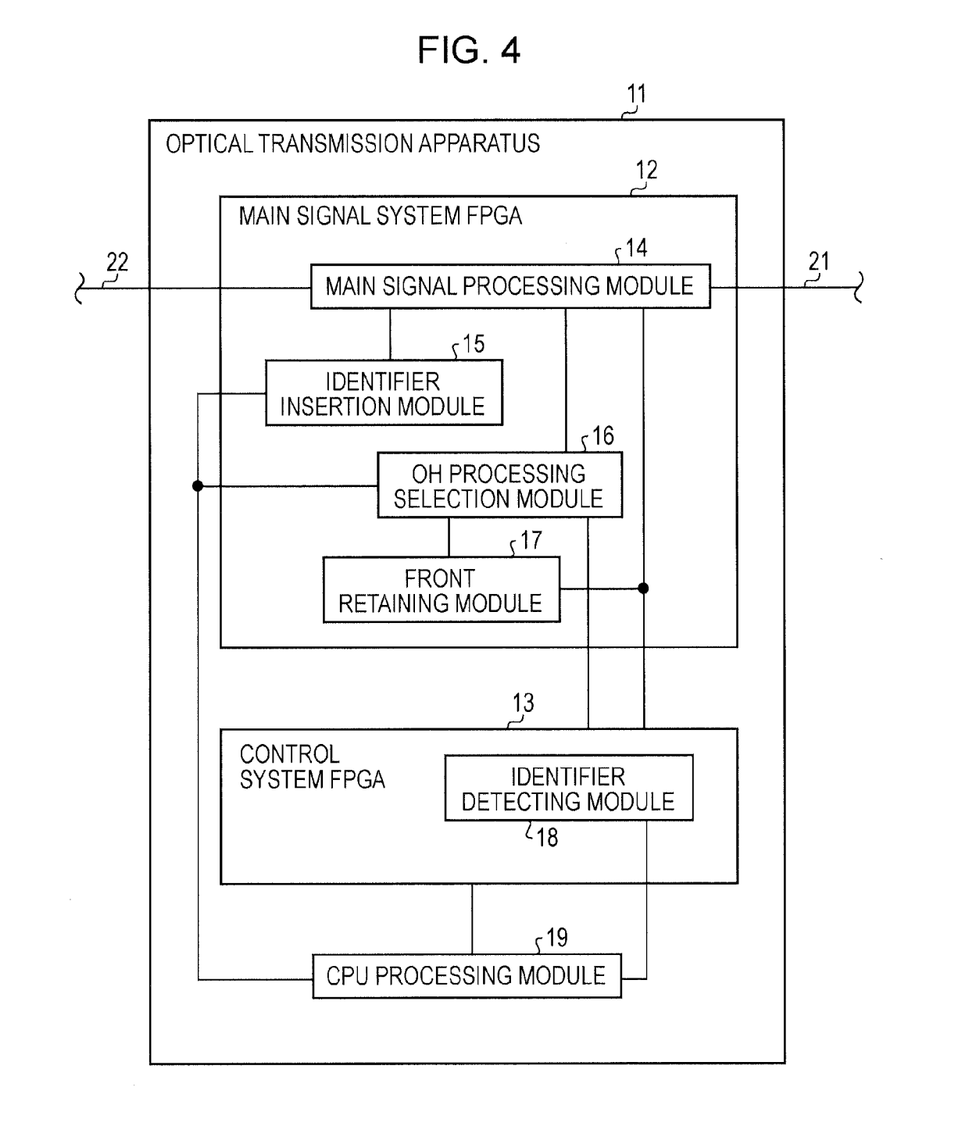
FIG. 4 is a block diagram illustrating an optical transmission apparatus according to a second embodiment.

FIG. 4 is a block diagram illustrating an optical transmission apparatus according to the second embodiment. As illustrated in FIG. 4, an optical transmission apparatus 11 includes a main signal system FPGA 12 as a first processing circuit and a control system FPGA 13 as a second processing circuit. The main signal system FPGA 12 and the control system FPGA 13 can be updated by individually downloading firmware.

The main signal system FPGA 12 and the control system FPGA 13 may be provided in different chips or in one chip.

The main signal system FPGA 12 includes a main signal processing module 14, an identifier insertion module 15 as an example of an insertion circuit, an overhead processing selection module 16 as an example of a selection circuit, and a front-end retaining module 17 as an example of a retaining circuit.

The main signal processing module 14 is connected to optical transmission paths 21 and 22 such as the optical fibers. The main signal processing module 14 processes a signal to be transmitted to the optical transmission apparatus on the receiving side (not illustrated).

The front-end retaining module 17 is coupled to the overhead processing selection module 16. The front-end retaining module 17 retains the overhead data.

The overhead processing selection module 16 is coupled to the main signal processing module 14. The overhead processing selection module 16 exclusively selects either the overhead data retained by the front-end retaining module 17 or the overhead data processed by the control system FPGA 13.

The identifier insertion module 15 is coupled to the main signal processing module 14. The identifier insertion module 15 inserts the identifier relating to the overhead data into the overhead data. An example of the identifier relating to the overhead data is an identifier indicating that it is unclear whether the overhead data is correct.

The control system FPGA 13 is coupled to the main signal processing module 14. The control system FPGA 13 processes the overhead data to be added to the signal to be transmitted to the optical transmission apparatus on the receiving side. The control system FPGA 13 includes an identifier detecting module 18 as an example of a detecting circuit. The identifier detecting module 18 detects the identifier included in the overhead data of a received signal.

The optical transmission apparatus 11 includes a central processing unit (CPU) processing module 19 as an example of a processing circuit. The CPU processing module 19 is coupled to the identifier detecting module 18, the control system FPGA 13, the identifier insertion module 15, and the overhead processing selection module 16. The CPU processing module 19 controls the overhead processing selection module 16 so that the overhead processing selection module 16 selects the overhead data and the identifier insertion module 15 so that the identifier insertion module 15 inserts the identifier based on the identifier detected by the identifier detecting module 18. The CPU processing module 19 masks sending of an alarm or switching of lines controlled by the control system FPGA 13 based on the identifier detected by the identifier detecting module 18.

Figure 5:
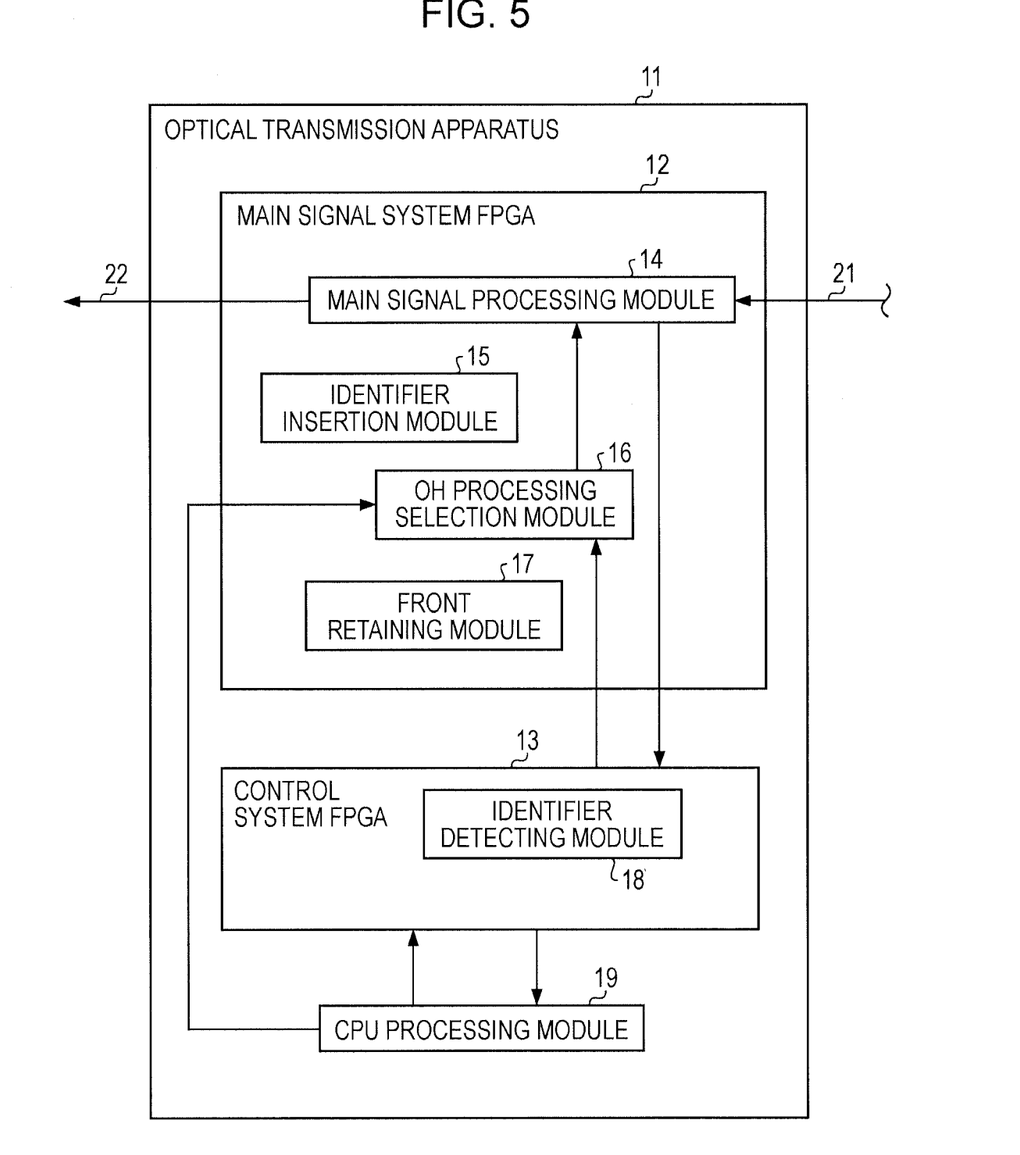
FIG. 5 is a block diagram illustrating a signal flow on a transmitting side when the optical transmission apparatus according to the second embodiment is operating normally.

FIG. 5 is a block diagram illustrating a signal flow on the transmitting side when the optical transmission apparatus according to the second embodiment operates normally. As illustrated in FIG. 5, the main signal processing module 14 receives a signal from another optical transmission apparatus (not illustrated) through the optical transmission path 21 when the optical transmission apparatus 11 on the transmitting side operates normally. The main signal processing module 14 extracts the overhead data included in the received signal and passes the overhead data to the control system FPGA 13.

The control system FPGA 13 processes the overhead data to be added to a signal to be transmitted to the optical transmission apparatus 2 on the receiving side. The control system FPGA 13 passes the overhead data that dynamically changes such as a general communication channel (GCC) and automatic protection switching (APS) to the CPU processing module 19. The CPU processing module 19 processes the overhead data that dynamically changes such as the GCC and the APS and returns the processed overhead data to the control system FPGA 13. The control system FPGA 13 outputs the overhead data processed by the CPU processing module 19 and the overhead data processed by the control system FPGA 13 to the overhead processing selection module 16.

The overhead processing selection module 16 outputs the overhead data processed by the CPU processing module 19 and the overhead data processed by the control system FPGA 13 to the main signal processing module 14 under control of the CPU processing module 19. The main signal processing module 14 adds the overhead data passed from the overhead processing selection module 16 to a signal to be transmitted and transmits the signal to the optical transmission apparatus on the receiving side (not illustrated) through the optical transmission path 22.

Figure 6:
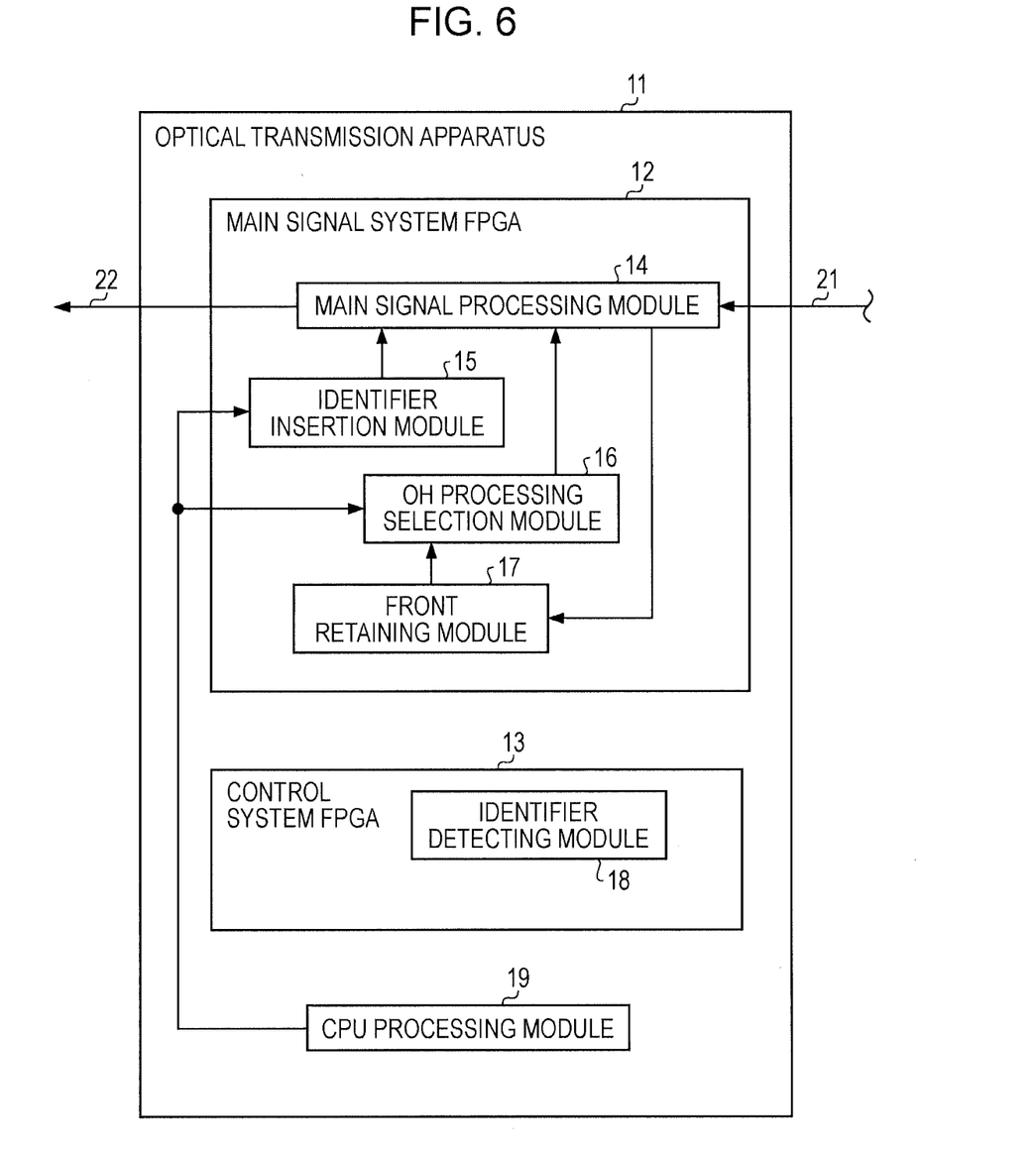
FIG. 6 is a block diagram illustrating a signal flow on the transmitting side when the optical transmission apparatus according to the second embodiment is performing uninterrupted firmware download operation.

FIG. 6 is a block diagram illustrating a signal flow on the transmitting side when the optical transmission apparatus according to the second embodiment is performing uninterrupted firmware download operation. As illustrated in FIG. 6, upon receiving an uninterrupted firmware download request from a network management system (not illustrated), the CPU processing module 19 outputs control signals to the identifier insertion module 15 and the overhead processing selection module 16 in the optical transmission apparatus 11 on the transmitting side ready for uninterrupted firmware download operation.

The identifier insertion module 15 produces the identifier to be inserted into the overhead data and outputs the identifier to the main signal processing module 14 under control of the CPU processing module 19. The overhead processing selection module 16 selects the front-end retaining module 17 as a supply source of the overhead data provided to the main signal processing module 14. The front-end retaining module 17 retains the overhead data included in a signal received by the main signal processing module 14 from another optical transmission apparatus (not illustrated) through the optical transmission path 21.

When the front-end retaining module 17 retains the overhead data, the control system FPGA 13 starts uninterrupted firmware download. While the uninterrupted firmware download is being executed, the overhead data retained by the front-end retaining module 17 and the identifier to be inserted by the identifier insertion module 15 are provided to the main signal processing module 14. The main signal processing module 14 inserts the identifier into the overhead data passed from the overhead processing selection module 16. The main signal processing module 14 adds the overhead data into which the identifier has been inserted to a signal to be transmitted and transmits the resulting signal to the optical transmission apparatus on the receiving side (not illustrated) through the optical transmission path 22.

Figure 7:
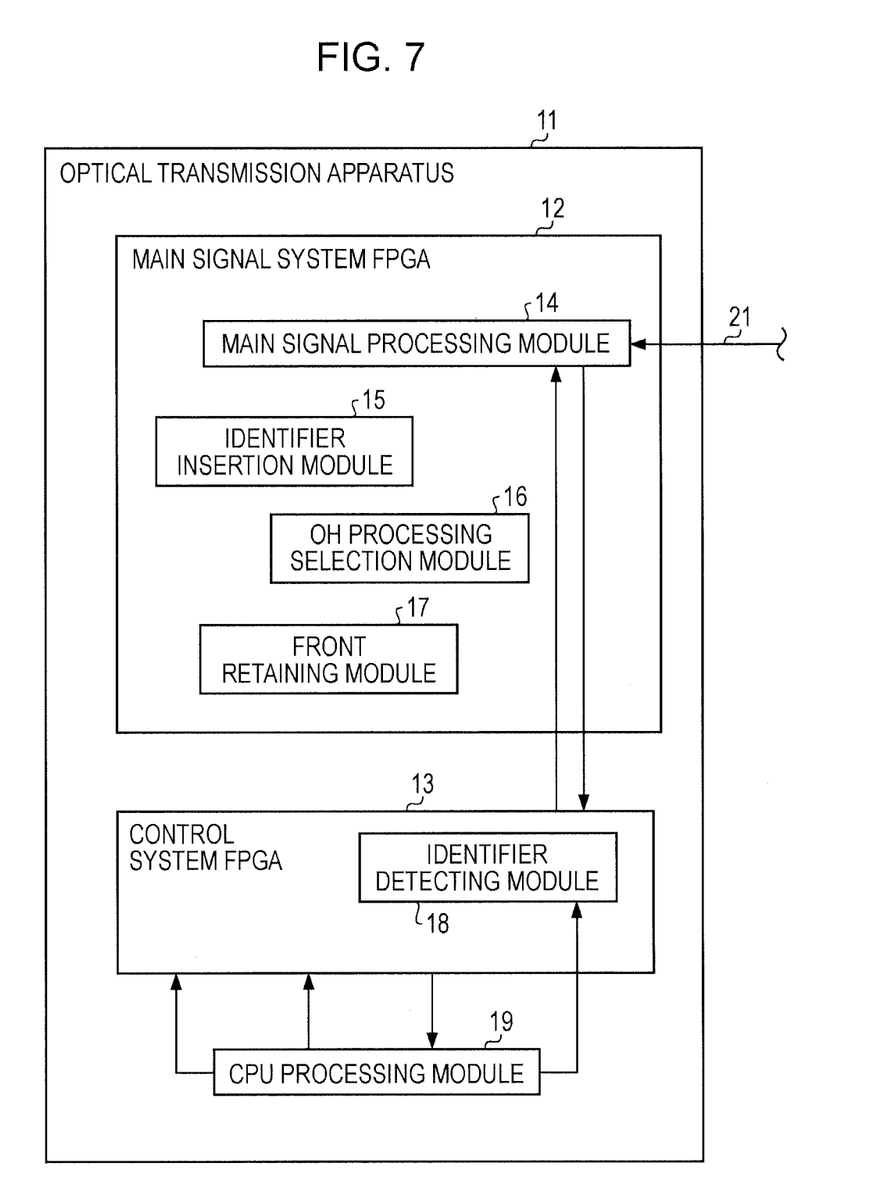
FIG. 7 is a block diagram illustrating a signal flow on a receiving side when the optical transmission apparatus according to the second embodiment is performing the uninterrupted firmware download operation.

FIG. 7 is a block diagram illustrating a signal flow on the receiving side when the optical transmission apparatus according to the second embodiment is performing the uninterrupted firmware download operation. As illustrated in FIG. 7, the main signal processing module 14 receives a signal from another optical transmission apparatus, which is not illustrated, (the optical transmission apparatus 11 on the transmitting side in FIG. 6) through the optical transmission path 21 when the optical transmission apparatus 11 on the receiving side is performing the uninterrupted firmware download operation. The main signal processing module 14 extracts the overhead data included in the received signal and passes the overhead data to the control system FPGA 13.

The identifier detecting module 18 of the control system FPGA 13 detects the identifier included in the overhead data passed from the main signal processing module 14. The CPU processing module 19 polls the identifier detecting module 18 and acquires the identifier detected by the identifier detecting module 18. Upon acquiring the identifier relating to the overhead data, e.g., the identifier indicating that it is unclear whether the overhead data is correct, the CPU processing module 19 outputs a control signal to the control system FPGA 13 so as to mask sending of an alarm or switching of lines. Upon receiving the control signal to mask the sending of the alarm or the switching of the lines, the control system FPGA 13 controls the main signal processing module 14 so that the main signal processing module 14 does not send the alarm or switch the lines.

Figure 8:
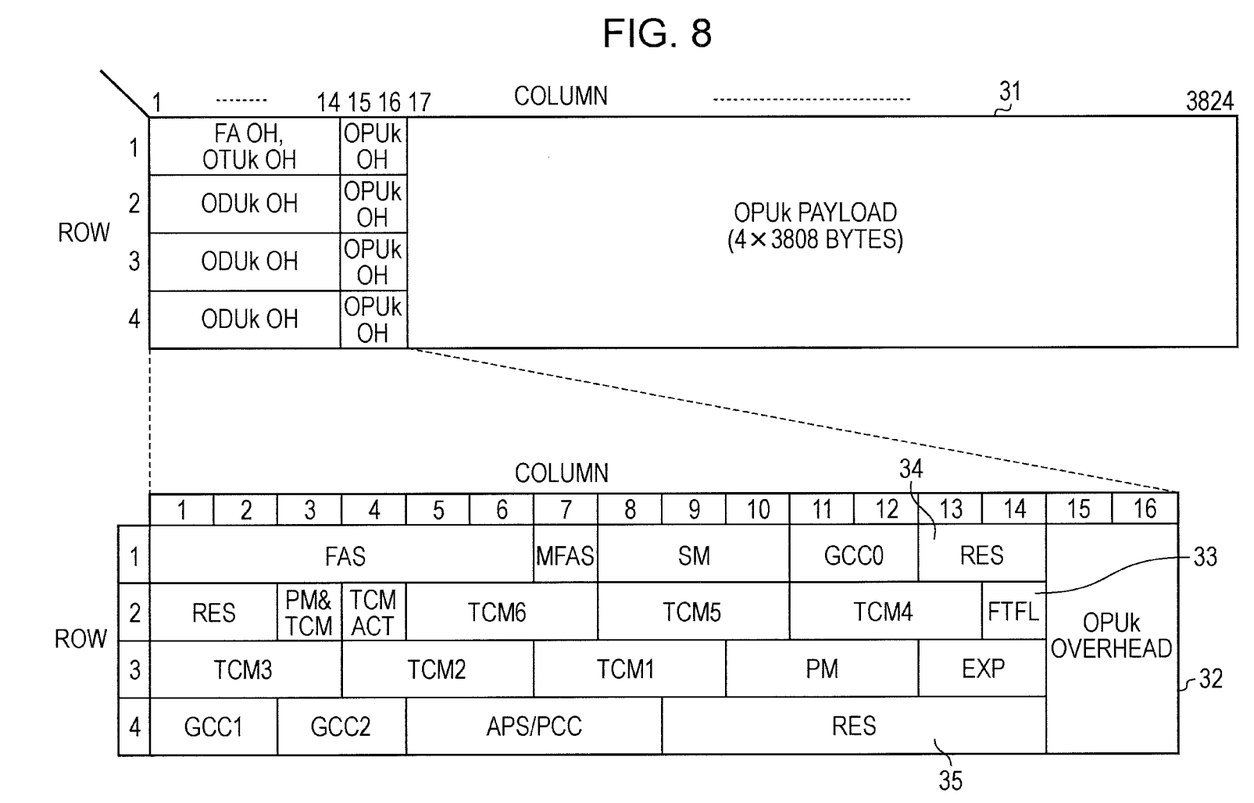
FIG. 8 is a schematic illustrating a frame format of an optical transfer network (OTN)

FIG. 8 is a schematic illustrating a frame format of OTN. As illustrated in FIG. 8, a frame structure 31 of OTN is structured as follows: an OPUk overhead is added to an OPUk payload that is a client signal, an ODUk overhead is added to the OPUk overhead, and an FA overhead and an OTUk overhead are further added to the ODUk overhead. In an OTUK frame, an FEC for error correction is further added to the end of the frame structure 31 of OTN, for example.

OPUk, ODUk, and OTUk stand for optical channel payload unit-k, optical data unit-k, and optical channel transport unit-k, respectively. FA stands for frame alignment. FEC stands for forward error correction.

An overhead 32 includes the OTUk overhead, the ODUk overhead, and the OPUk overhead and has an FTFL 33 of 1 byte, and an RES34 and an RES 35 each of 10 bytes, for example. In FIG. 8, one column is one byte. FTFL stands for fault type & fault location reporting channel. The FTFL is a region used for forwarding fault information of the lines. RES stands for reserved for future international standardization. The RES is a region reserved for future use.

Figure 9:
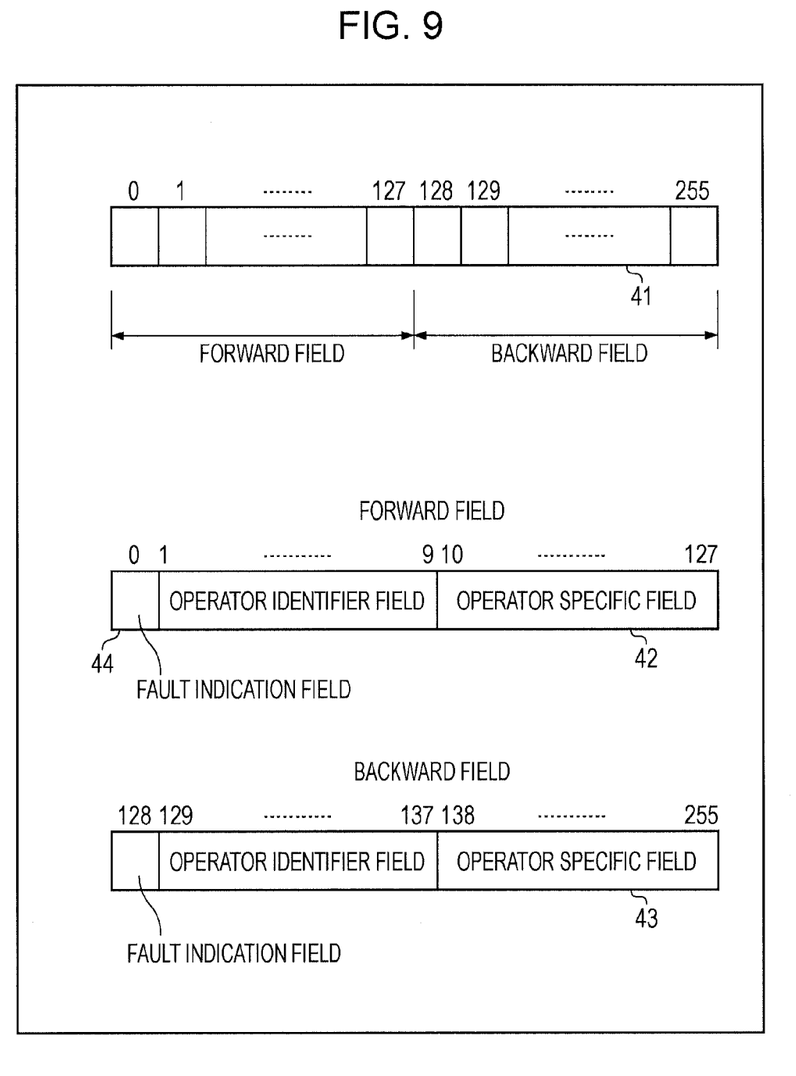
FIG. 9 is a schematic illustrating a fault type & fault location reporting channel (FTFL) message structure.

FIG. 9 is a schematic illustrating an FTFL message structure. As illustrated in FIG. 9, an FTFL message 41 is composed of 256 frames. A forward field 42 to be sent in a forward direction is allocated to bytes 0 through 127, i.e., 128 bytes, of the FTFL message 41. A backward field 43 to be sent in a backward direction is allocated to bytes 128 through 255, i.e., 128 bytes, of the FTFL message 41.

When the identifier is inserted into the FTFL message, the identifier may be inserted into a fault indication field 44 in the forward field 42 of the FTFL message 41. A fault indication code representing a failure type is set into the fault indication field 44. The length of the fault indication code is one byte, for example.

Figure 10:
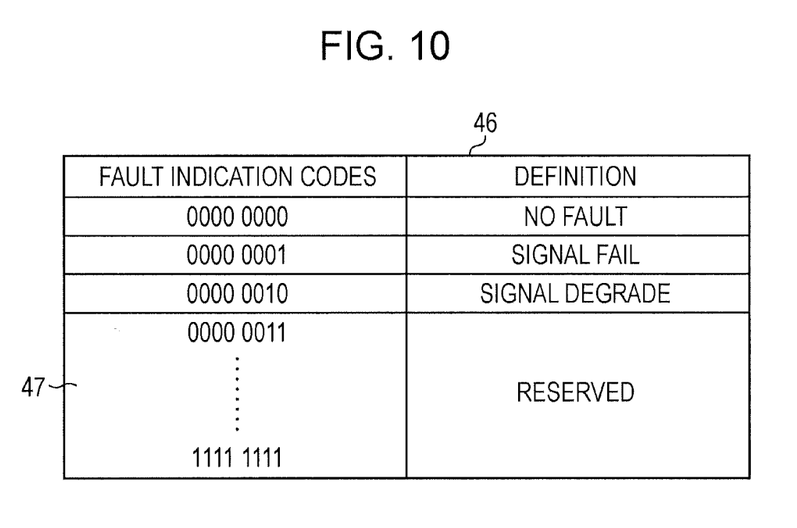
FIG. 10 is a table illustrating an example of definitions of fault indication codes.

FIG. 10 is a table illustrating an example of definitions of the fault indication codes. As illustrated in a definition list 46 of FIG. 10, the fault indication codes from "00000011" to "11111111" are reserved for future use as a reserved region 47. The identifier may be inserted into the FTFL message by using the fault indication codes in the reserved region 47. In this case, the identifier insertion module 15 includes an insertion circuit that inserts 256 frames (256 frames form a multiframe structure, and are also referred to as 256 multiframes).

In the fault indication codes of the reserved region 47, the most significant bit of the fault indication code may be defined as a restart status code, for example. For example, the restart status code may be set to "1" by the identifier insertion module 15 when the CPU processing module 19 of the optical transmission apparatus 11 receives the uninterrupted firmware download request. The restart status code of "1" indicates that it is unclear whether the overhead data is correct, for example. For example, the restart status code may be set to "0" by the identifier insertion module 15 when the CPU processing module 19 receives a request to complete uninterrupted firmware download. In this case, the identifier insertion module 15 includes a circuit that inserts "0" or "1" into the most significant bit of the fault indication code in the reserved region 47.

In the fault indication codes of the reserved region 47, the second bit from the most significant bit of the fault indication code may be defined as an overhead status code. For example, the overhead status code may be set to "1" by the identifier insertion module 15 when the CPU processing module 19 of the optical transmission apparatus 11 receives the uninterrupted firmware download request. For example, the overhead status code may be set to "0" by the identifier insertion module 15 when the CPU processing module 19 receives the request to complete uninterrupted firmware download. In this case, the identifier insertion module 15 includes a circuit that inserts "0" or "1" into the second bit from the most significant bit of the fault indication code in the reserved region 47.

In the fault indication codes of the reserved region 47, the lower six bits ("000000" to "111111") of each fault indication code may be used as a number representing each byte of the overhead 32 of 64 bytes illustrated in FIG. 8, for example. For example, in the overhead 32 illustrated in FIG. 8, the first column at the first row (the head of the FAS) is given a value of "000000" and the sixteenth column at the fourth row (the end of the OPUk overhead) is given a value of "111111". The GCC, which is one of the pieces of overhead data that dynamically change, is given a value in a range from "110001" to "110100". The APS is given a value in a range from "110101" to "111000". In this case, the identifier insertion module 15 includes a circuit that inserts the bits ranging from "000000" to "111111" into the lower six bits of the fault indication code in the reserved region 47.

The overhead status code of "1" indicates that it is unclear whether the overhead data identified with the lower six bits of the fault indication code in the reserved region 47 is correct, for example. When the fault indication code in the reserved region 47 is used, information of whether the overhead data of 1 byte is correct can be sent with the FTFL message of 256 frames, for example. Therefore, when information indicating whether the overhead data is correct is sent for all of the bytes of the overhead 32 of 64 bytes illustrated in FIG. 8, the identifier insertion module 15 includes a circuit that inserts 64 multiframes each composed of the FTFL of 256 multiframes.

When the identifier is inserted into the RES of the overhead 32 of 64 bytes illustrated in FIG. 8, the identifier may be inserted into any 1 byte out of 10 bytes of the RES. In 8 bits, i.e., 1 byte, of the RES into which the identifier is inserted, the most significant bit may be defined as the restart status code, for example, in the same manner that the identifier is inserted into the FTFL message as described above. Likewise, the second bit from the most significant bit may be defined as the overhead status code, for example. In addition, the low six bits may be used for a number representing each byte of the overhead 32 of 64 bytes illustrated in FIG. 8, for example.

In this case, the identifier insertion module 15 includes a circuit that inserts "0" or "1" into the most significant bit or the second bit from the most significant bit of the RES. The identifier insertion module 15 includes a circuit that inserts bits ranging from "000000" to "111111" into the lower six bits of the RES. Information indicating whether the overhead data of one byte is correct can be sent with the RES of one byte. Therefore, when information indicating whether the overhead data is correct is sent for all of the bytes of the overhead 32 of 64 bytes illustrated in FIG. 8, the identifier insertion module 15 includes a circuit that inserts 64 multiframes.

The overhead data into which the identifier is inserted is not limited to the FTFL message and the RES. Any overhead data can be used as long as the overhead data is forwarded. Instead of sending the information indicating whether the overhead data is correct for all of the bytes of the overhead 32 of 64 bytes illustrated in FIG. 8, only the overhead data for which it is unclear whether the overhead data is correct may be sent. The CPU processing module 19 may include a program, a memory storing data, and a processor executing the program and realize some of the functions of the above-described optical transmission apparatus with software.

According to the second embodiment, the same effect as the first embodiment can be obtained. The overhead data for which it is unclear whether the overhead data is correct can be identified, for example, by providing numbers to the overhead 32 with codes of 6 bits, for example. As a result, the optical transmission apparatus on the receiving side can send an alarm or not or switch the lines or not depending on the overhead data for which it is unclear whether the overhead data is correct.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission system, comprising:
   an optical transmitting apparatus including:
      a first processing circuit configured to process a transmission signal to be transmitted,
      a second processing circuit configured to process overhead data, the processed overhead data being multiplexed to the transmission signal,
      a retaining circuit configured to retain the overhead data, the retained overhead data being multiplexed to the transmission signal, and
      an insertion circuit configured to generate an identifier to be inserted into the retained overhead data; and
   an optical receiving apparatus including a detecting circuit configured to receive the transmission signal transmitted from the optical transmitting apparatus, and detect the identifier,
   wherein, when the overhead data is a predetermined state, the first processing circuit multiplexes the retained overhead data into which the identifier is inserted and the detecting circuit detects the identifier.

2. The optical transmission system according to claim 1, wherein the identifier has information for indicating that the overhead data is incorrect or that the overhead data is unclear whether the overhead data is correct.

3. The optical transmission system according to claim 1, wherein the identifier has information for indicating a position at which the overhead data that is incorrect or the overhead data that is unclear whether the overhead data is correct is assigned.

4. The optical transmission system according to claim 1, wherein the first processing circuit includes a selection module configured to select the processed overhead data or the retained overhead data to be multiplexed to the transmission signal.

5. The optical transmission system according to claim 1, wherein the second processing circuit includes a programmable circuit, and when data installed in the programmable circuit is updated while the first processing circuit is operating, the first processing circuit multiplexes the retained overhead data into which the identifier is inserted.

6. The optical transmission system according to claim 1, wherein the optical receiving apparatus includes a third processing circuit configured to avoid, when the identifier is detected, sending of an alarm or switching of lines.

7. The optical transmission system according to claim 1, wherein the identifier is inserted into a position of the overhead data used for forwarding fault information of the lines.

8. The optical transmission system according to claim 1, wherein the identifier is inserted into a position of the overhead data reserved for future use.

9. An optical transmitting apparatus comprising:
   a first processing circuit configured to process a transmission signal to be transmitted;
   a second processing circuit configured to process overhead data, the processed overhead data being multiplexed to the transmission signal;
   a retaining circuit configured to retain the overhead data, the retained overhead data being multiplexed to the transmission signal; and
   an insertion circuit configured to generate an identifier to be inserted into the retained overhead data.

10. The optical transmitting apparatus according to claim 9, wherein the identifier has information for indicating that the overhead data is incorrect or that the overhead data is unclear whether the overhead data is correct.

11. The optical transmitting apparatus according to claim 9, wherein the identifier has information for indicating a position at which the overhead data that is incorrect or the overhead data that is unclear whether the overhead data is correct assigned.

12. The optical transmitting apparatus according to claim 9, wherein the first processing circuit includes a selection module configured to select the processed overhead data or the retained overhead data to be multiplexed to the transmission signal.

13. The optical transmitting apparatus according to claim 9,
   wherein the second processing circuit includes a programmable circuit, and when data installed in the programmable circuit is updated while the first processing circuit is operating, the first processing circuit multiplexes the retained overhead data into which the identifier is inserted.

14. The optical transmitting apparatus according to claim 9, wherein the identifier is inserted into a position of the overhead data used for forwarding fault information of the lines.

15. The optical transmitting apparatus according to claim 9, wherein the identifier is inserted into a position of the overhead data reserved for future use.

16. A transmission method of overhead data comprising:
   retaining overhead data, the retained overhead data being multiplexed to a transmission signal to be transmitted, by an optical transmitting apparatus;
   multiplexing, when the overhead data is a predetermined state, the retained overhead data into which an identifier is inserted, by the optical transmitting apparatus;
   transmitting a signal to which the retained overhead data is multiplexed, by the optical transmitting apparatus;
   receiving the transmitted signal, by an optical receiving apparatus; and detecting the identifier in the retained overhead data of the received signal, by the optical receiving apparatus to identify a state of the received overhead data and avoid sending an unnecessary alarm or unnecessarily switching lines.

17. The transmission method according to claim 16, wherein the identifier has information for indicating that the overhead data is incorrect or that the overhead data is unclear whether the overhead data is correct.

18. The transmission method according to claim 16, wherein the optical receiving apparatus is configured to avoid, when the identifier is detected, sending of an alarm or switching of lines.

* * * * *